United States Patent [19]

Richards et al.

[11] Patent Number: 5,430,489

[45] Date of Patent: Jul. 4, 1995

[54] VIDEO TO FILM CONVERSION

[75] Inventors: John W. Richards, Stockbridge; Morgan W. A. David, Farnham; Martin R. Dorricott, Basingstoke, all of England

[73] Assignee: Sony United Kingdom, Ltd., Staines, United Kingdom

[21] Appl. No.: 964,091

[22] Filed: Oct. 21, 1992

Related U.S. Application Data

[63] Continuation-in-part of Ser. No. 745,337, Aug. 15, 1991, Pat. No. 5,191,427, and Ser. No. 735,354, Jul. 24, 1991, Pat. No. 5,181,111.

[30] Foreign Application Priority Data

Dec. 3, 1991 [GB] United Kingdom ............... 9125732

[51] Int. Cl.⁶ .............................................. H04N 7/01
[52] U.S. Cl. .................................... 348/446; 348/448
[58] Field of Search ................ 358/140, 11, 185, 214, 358/216, 56, 244, 244.1, 244.2, 358; H04N 7/01, 5/87; 348/443, 446, 448, 447, 458, 459

[56] References Cited

U.S. PATENT DOCUMENTS

| | | | |
|---|---|---|---|
| 4,496,991 | 1/1985 | Dyfverman | 358/311 |
| 4,609,941 | 9/1986 | Carr et al. | 358/136 |
| 4,761,686 | 8/1988 | Willis | 358/160 |
| 4,901,161 | 2/1990 | Giovanella | 358/346 |
| 4,972,274 | 10/1990 | Becker et al. | 360/14.1 |
| 5,016,101 | 5/1991 | Richards et al. | 358/410 |
| 5,115,311 | 5/1992 | Jaqua | 358/140 |
| 5,181,111 | 1/1993 | Hedley et al. | 358/140 |
| 5,191,427 | 3/1993 | Richards et al. | 358/214 |

Primary Examiner—Victor R. Kostak
Assistant Examiner—Nathan Flynn
Attorney, Agent, or Firm—William S. Frommer; Alvin Sinderbrand

[57] ABSTRACT

In order to simulate, on set or on location, a subsequent video to film conversion process, an input interlaced video signal is converted in any of a variety of ways to a progressive scan format video signal, and then interlaced fields of the progressive scan format frames are displayed on a video monitor or view finder.

22 Claims, 9 Drawing Sheets

VIDEO TO FILM CONVERSION

CROSS REFERENCE TO RELATED APPLICATIONS

This application is a continuation-in-part of application Ser. No. 745,337, filed Aug. 15, 1991, now U.S. Pat. No. 5,191,427, and is also a continuation-in-part of application Ser. No. 735,354, filed Jul. 24, 1991, now U.S. Pat. No. 5,181,111.

BACKGROUND OF THE INVENTION

1. Field of the Invention

This invention relates to video to film conversion.

2. Description of the Prior Art

Recent developments in video signal processing have enabled a whole host of different video effects and operations, and the use of high definition digital video provides quality which is approaching, or even surpassing that obtainable by conventional film. However, for many years to come, there will be a need to be able to distribute as film or the like material which has been processed, if not also acquired, in high definition digital video format.

One popular video standard (SMPTE 240M) is characterised by 60 fields per second and a 2:1 interlace. However, established standards for film are 30 frames per second and 24 frames per second. Sony Corporation has developed an electron beam recorder which can produce film material from a video signal and has also developed apparatus for converting the video signal from a standard format to a format which the electron beam recorder can use.

In one previously proposed process for recording SMPTE 240M video as 30 frame/s film, called a "field combination process", pairs of temporarily adjacent fields of the 60 field/s video signal are composited to produce frames at 30 frame/s, and the frames are recorded on film. However, this process produces film which suffers from "double-imaging" in areas of motion. Therefore, an improved process has been developed, involving "motion compensated temporal interpolation", in which: (i) frames at 60 frame/s are produced, each either from one or from three of the input fields, (ii) motion is detected in areas of the picture between pairs of temporally adjacent frames, (iii) output frames are produced at 30 frame/s, with each pixel of each output frame derived from pixels in the respective pair of 60 frame/s spatially displaced from the output pixel in dependence upon the detected motion and the temporal offset between the output frame and the two progressive scan frames from which it is formed, and (iv) the output frames are recorded on film. (Interlace to progressive scan conversion is described in detail in United Kingdom patent application GB 2231228A, especially with reference to FIGS. 5 to 14 thereof). Motion compensated temporal interpolation is also described in GB 2231228A, especially with reference to FIGS. 15 to 48 thereof. Conversion from 60 field/s 2:1 interlace video to 30 frame/s film is described in detail in United Kingdom patent application GB 2249907A particularly with reference to FIGS. 57 and 60 thereof. The contents of GB 2231228A and GB 2249907A are incorporated herein by reference as if printed in full below.) This motion compensated temporal interpolation process is computationally intensive, and therefore requires complex, bulky and expensive apparatus, and with present technology cannot operate at real-time rate, but it does overcome to a large extent the double imaging problem.

In another previously proposed process for recording SMPTE 240M video as 24 frame/s film, known as the "drop field process", in a sequence of ten fields of the video signal, fields 3 and 8, for example, are ignored, the fields of each remaining pair of temporally adjacent fields (1 and 2; 4 and 5; 6 and 7; and 9 and 10) are composited to produce four frames at 24 frame/s, and these frames are recorded on film. Like the field combination process, the drop field process also suffers from double imaging in areas of motion. Furthermore, there is a 12 Hz temporal judder because a predetermined pair of the ten input fields are ignored. Therefore, an improved process has been developed, again involving motion compensated temporal interpolation, in which: (i) frames at 60 frame/s are produced, each either from one or from three of the input fields; (ii) motion is detected in areas of the picture between pairs of temporally adjacent frames; (iii) output frames are produced at 24 frame/s, four for every ten of the 60 frame/s frames, with each pixel of each output frame derived from pixels in a respective pair of the 60 frame/s frames spatially displaced from the output pixel in dependence upon the detected motion and the temporal misalignment between the output frame and the pair of frames from which is formed; and (iv) the output frames are recorded on film. Conversion from 60 field/s 2:1 interlace video to 24 frame/s film is described in GB 2231228A with reference to FIGS. 1 to 48 thereof. Again, this form of motion compensated temporal interpolation is computationally intensive, requiring complex, bulky and expensive apparatus, but it does overcome the double imaging problem and the judder problem to a large extent.

The lower output frame rate of 24 Hz can only support motion resulting in temporal frequencies up to 12 Hz in a picture without alias. Motion with components between 12 Hz and 30 Hz can be captured but only as aliased components. When the picture is down converted to the 24 Hz frame rate, even using motion compensated interpolation, all motion with temporal frequency components above 12 Hz will be aliased to lower frequencies and produce subjectively poor motion portrayal. Both the drop field process and the more complex motion compensated interpolation process produce the correct output component rate, but introduce motion artifacts in the output picture due to the down conversion from 30 Hz to 24 Hz frame rate. A similar problem arises in conversion from 60 field/s 2:1 interlace to 30 frame/s film. However, the motion artifacts are less pronounced.

When a picture is shot on a set or on location using video, the video material can immediately be viewed using a video monitor or viewfinder. It is, however, impracticable to convert the material to film, on set or on location, using the processes mentioned above, because the cost and size of the required equipment are prohibitive. When the video material is viewed on set or on location, the above mentioned motion artifacts which may later be introduced by or become apparent due to the video to film conversion process will not be apparent, and if the subsequent conversion process introduces artifacts which are unacceptable, it is extremely expensive to reshoot the video at a later date, for example with slower pans or action, in an attempt to obtain an artifact free end product.

OBJECT AND SUMMARY OF THE INVENTION

An object of the present invention is to provide a method which can simulate, on set or on location, motion artifacts which may be introduced in a subsequent video to film conversion process.

In accordance with the present invention, there is provided a method, preferably performed at real-time rate, of displaying an input interlaced format video signal on an interlaced display, comprising the steps of: forming from at least some of the fields of the input video signal a series of progressive scan format frames, preferably at the frame rate of the film which will subsequently be produced; and displaying sequentially interlaced fields of the progressive scan format frames. Because there is no temporal offset between the fields of each displayed field pair, the method is better able to simulate subsequent motion artifacts arising in video to film conversion than if the input interlaced video signal were simply displayed on an interlaced monitor especially as film projectors generally have a double-shuttered projection system.

In one version of the method of the invention, which can simulate the drop field and field combination processes, each progressive scan format frame is produced by vertical interpolation of and temporal interpolation between a respective pair of the input fields. Due to the temporal interpolation, double imaging will occur in the displayed picture in areas of motion, as it does in the actual drop field and field combination processes. When simulating the drop field process, two out of every ten fields of the input signal are dropped, and therefore a temporal judder will be introduced in the displayed picture, as in the actual drop field process. Alternatively, when simulating the field combination process, no input fields are dropped, and accordingly there will be no temporal judder. The vertical and temporal interpolation may be performed by a two-dimensional filter, or alternatively by forming a preliminary series of progressive scan format frames at twice the frame rate of the first-mentioned series of progressive scan format frames, each of the frames in the preliminary series being produced by intra-field interpolation of a respective one of the input fields; and forming each of the frames in the first-mentioned series by inter-frame interpolation between a respective pair of frames of the preliminary series.

In another version of the method of the invention, which can simulate to some extent the motion artifacts arising in the motion compensated temporal interpolation processes, each of the progressive scan format frames is produced by intra-field interpolation of a respective one of the input fields and/or by inter-field interpolation between the fields temporally adjacent that field. This version of the method partially imitates the actual processes because it removes the double image, but there is some loss of vertical resolution. In order to simulate the actuate process for conversion from 60 field/s 2:1 interlace to 24 frame/s, conveniently four out of every ten fields of the input signal provide said one fields. However, this does suffer from a disadvantage that a temporal judder is produced in the displayed picture. On the other hand, in order to simulate the actual process for conversion from 60 field/s 2:1 interlace to 30 frame/s, conveniently alternate input fields provide said one fields. In this case, there will be no temporal judder.

In a modification to the simulation method described in the preceding paragraph, some of the frames of said series of progressive scan format frames are each produced by vertical interpolation of and temporal interpolation between a respective pair of the input fields; and others of the frames of the said series are each produced by intra-field interpolation between the fields temporally adjacent that input field. This removes the temporal judder described in the preceding paragraph. However, said some frames have high resolution in static areas and double imaging in areas of motion, and said other frames have lower resolution in areas of motion if intra-field interpolation is used. The switching between these types of frame may be noticeable. The temporal and vertical interpolation may be performed by a two-dimensional filter, or alternatively by producing a respective preliminary progressive scan format frame from each field of said pairs of fields, and by forming said some frames by inter-frame interpolation between the frames of the pairs of preliminary frames. In one example of this modified method, first and third of four of the progressive scan format frames are formed by vertical interpolation of and temporal interpolation between first and second, and sixth and seventh, respectively of ten of the input fields; the second of the four frames is formed by intra-field interpolation of the fourth of the ten fields and/or inter-field interpolation between the third to fifth of the ten fields; and the fourth of the four frames is formed by intra-field interpolation of the ninth of the ten fields and/or inter-field interpolation between the eighth to tenth of the ten fields.

In a further modification, which attempts to overcome the switching problem, the frames of the series are each produced by temporal interpolation between a respective pair of temporally adjacent fields of the input signal. In one way of doing this, alternate frames of the series are produced with one temporal interpolation ratio (for example ¼:¾) and the other frames of the series are produced with another interpolation ratio (for example ¾:¼). When using this method to simulate conversion from 60 field/s 2:1 interlace to 24 frame/s film, four frames of the series of progressive scan format frames are temporally interpolated between four pairs of a series of ten input fields. This modification improves motion portrayal, but at the expense of slightly reduced dynamic resolution.

Other objects, features and advantages of the present invention will become apparent upon consideration of the following detailed description of a preferred embodiment thereof, especially when considered with the accompanying drawings in which like reference numerals are employed to designate the same or similar components in the different figures.

DETAILED DESCRIPTION OF THE PREFERRED EMBODIMENT

Figure 1:
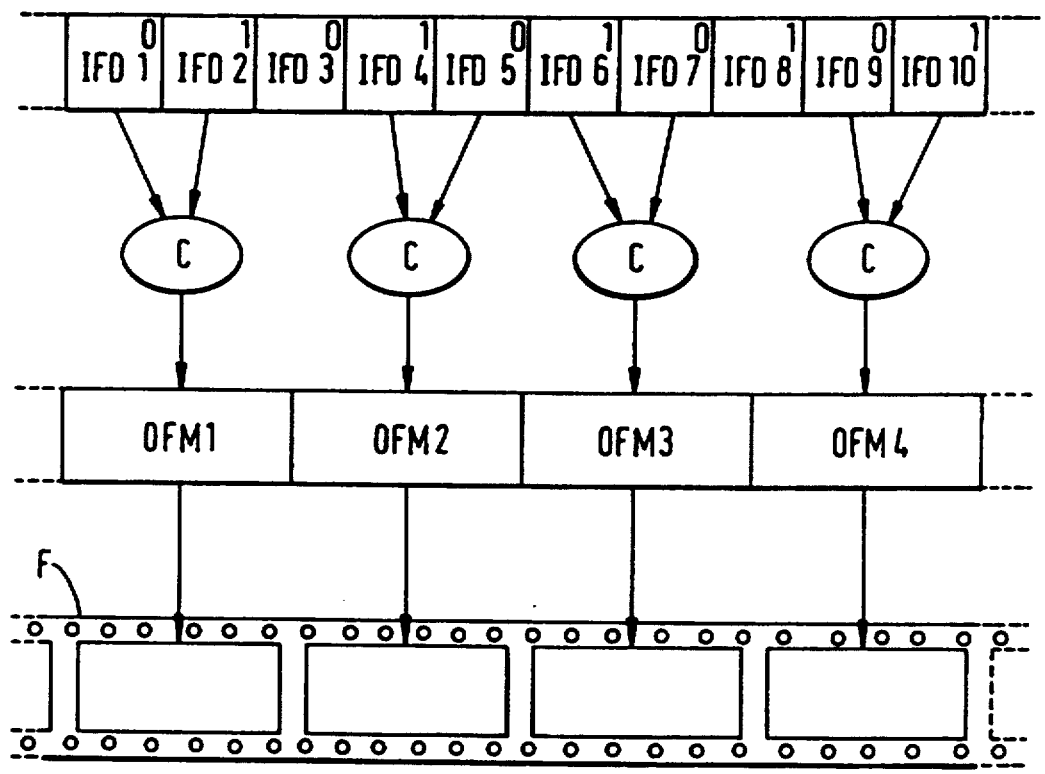
FIG. 1 illustrates the known drop field process for converting 60 field/s 2:1 interlaced video to 24 frame/s film.

Referring to FIG. 1, in known conversion from 60 field/s 2:1 interlace video to 24 frame/s film by the drop field process, in a sequence of ten input fields IFD1 to IF10, the first two input fields IFD1 and IFD2 of opposite polarity are composited to produce a first output frame OFM1; the third input field IFD3 is ignored or dropped; the fourth and fifth input fields IFD4 and IFD4 of opposite polarity are composited to form the second output frame OFM2; the sixth and seventh input fields IFD6 and IFD7 of opposite polarity are composited to form the third output frame OFM3; the eighth input field IFD8 is dropped; and the ninth and tenth input fields IFD9 and IFD10 are composited to form the fourth output frame OFM4. The output video frames are then recorded on film F. It can be seen that the first and third output frames OFM1 and OFM3 are temporally sited relative to their originating fields IFD1 and IFD2, and IFD6 and IFD7, respectively, differently to the temporal siting of the second and fourth output frames OFD2 and OFD4 relative to their originating fields IFD4 and IFD5, and IFD9 and FID10, respectively. Therefore, there is a temporal judder in the output picture, at 12 Hz. Also because of the temporal offset between the two input fields, for example, IFD1 and IFD2, making up a single output frame, for example OFM1, double imaging will occur in the output picture in areas of motion.

Figure 2:
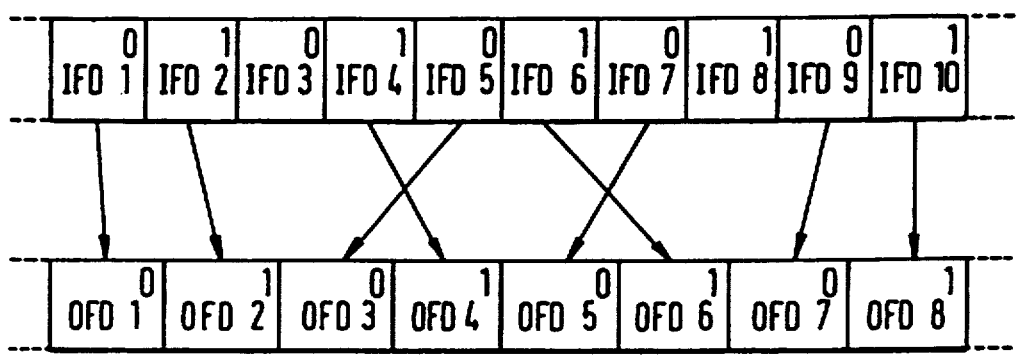
FIG. 2 illustrates an unacceptable simulation of the FIG. 1 process.

In order to simulate the drop field conversion process on set or on location, it might be considered appropriate to display the video on a 2:1 interlace monitor or camera viewfinder having a 48 Hz field rate, dropping fields FD3 and FD8 in each sequence of ten fields. This is illustrated in FIG. 2. Input fields IFD1, IFD2, IFD9 and IFD10 can be simply used to produce output fields OFD1, OFD2, OFD7 and OFD8, respectively because the polarities match. However, for polarity reasons the order of viewing input fields IFD4 and IFD5 must be reversed, as too must that of input fields IFD6 and IFD7. Thus, output fields OFD3 and OFD6 are produced from input fields IFD5, IFD4, IFD7 and IFD6, respectively. Motion portrayal in the displayed output video will be extremely bizarre due to the reversal of the order in which input fields IFD4 and IFD5 are displayed and that in which input fields IFD6 and IFD7 are displayed, and more particularly because input field IFD7 is displayed immediately after input field IFD4. Thus, the output picture will look dreadful if there is any motion in the picture and will not in any way be representative of the motion in the film.

Figure 3:
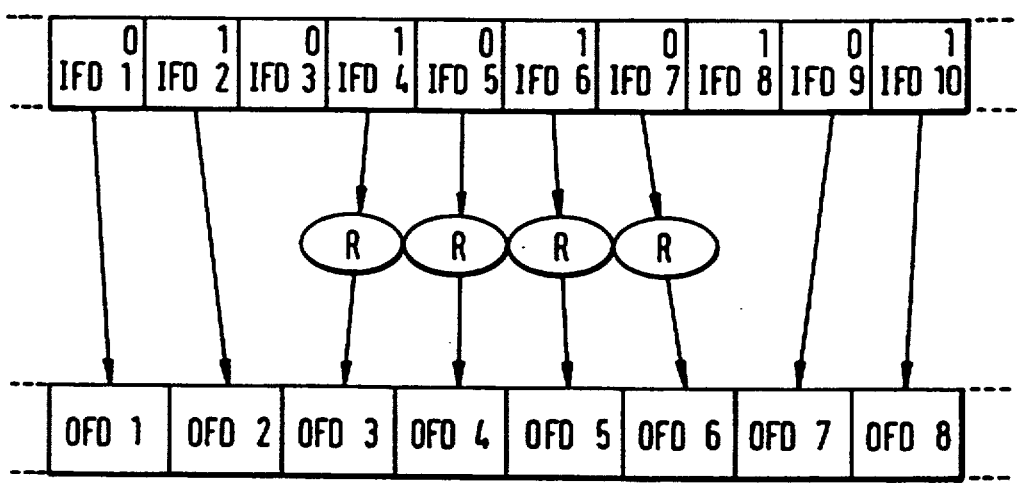
FIG. 3 also illustrates an unacceptable simulation of the FIG. 1 process.

In order to deal with this problem, it might be considered appropriate to perform a polarity reversal process on input fields IFD4 to IFD7, as shown in FIG. 3, or possibly to alter the raster scanning system of the display monitor (although this may not be feasible). If this were done, then the input fields IFD1, IFD2, IFD4 to IFD7, IFD9 and IFD10 are used in the proper sequence to produce the output fields OFD1 to OFD8. Nevertheless, the output fields are 2:1 interlaced with temporal offsets between successive fields, whereas when a film is viewed with a standard double-shutter projector, the same image is shown twice for each frame, with no temporal offset between the two showings of each frame. Accordingly, the scheme shown in FIG. 3 is still not representative of and capable of simulating the motion artifacts which will be produced in the actual drop field video to film conversion process described above with reference to FIG. 1.

Figure 4:
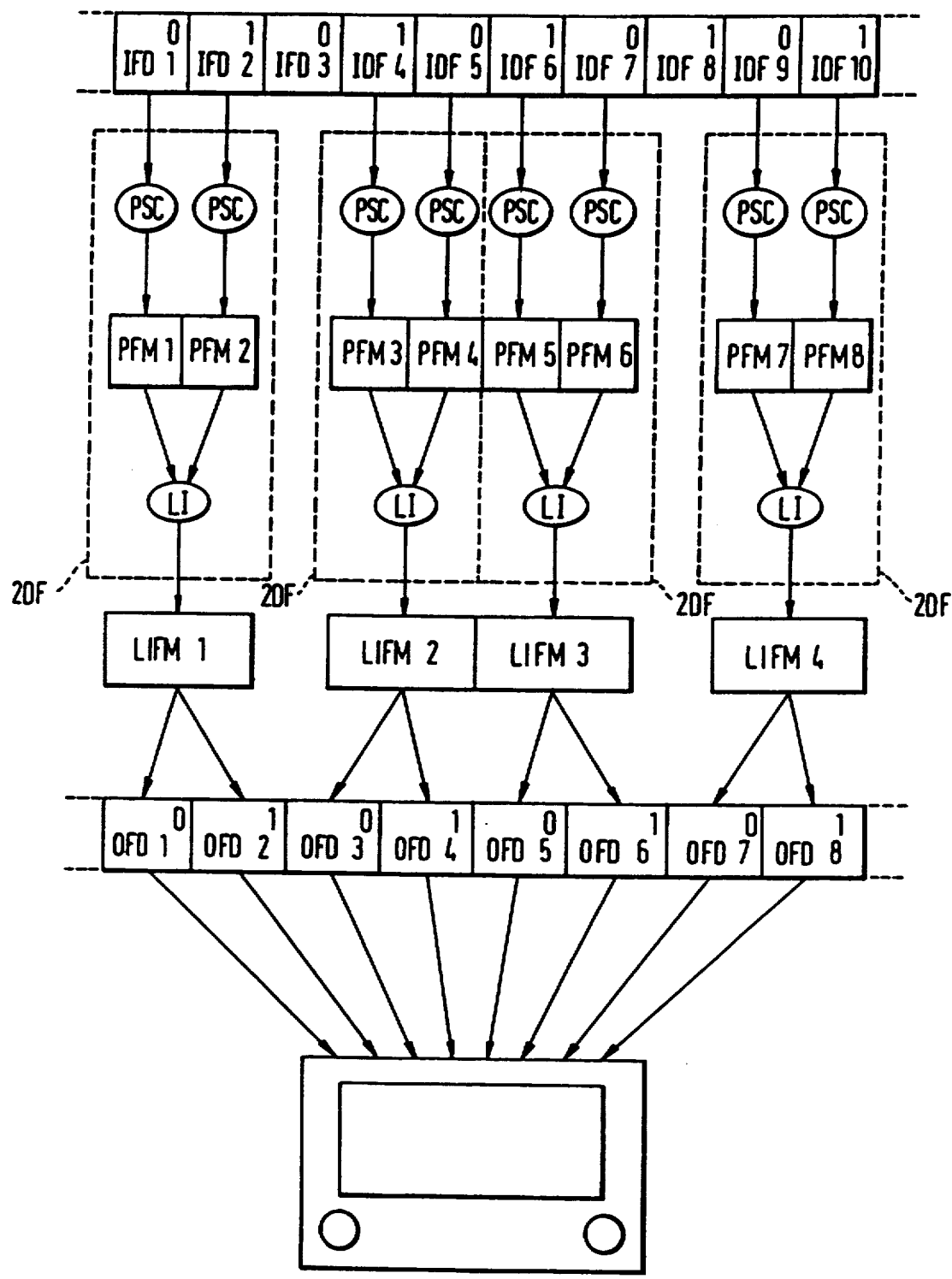
FIG. 4 illustrates a first example of a method according to the invention for simulating conversion from 60 field/s 2:1 interlaced video to 24 frame/s film.

FIG. 4 illustrates a first example of the invention, in this case for simulating on a video display the 60 field/s 2:1 interlaced video to 24 frame/s film drop field conversion process. Firstly, eight out of ten input fields IFD1 to IFD10 are used to produce respective progressive scan format frames PFM1 to PFM8. In the particular example shown input fields IFD1, IFD2, IFD4 to IFD7, IFD9 and IFD10 are used, and input fields IFD3 and IFD8 are dropped. The 2:1 interlace to progressive scan format conversion is performed by intra-field interpolation. Secondly, from pairs of the progressive frames which are temporally adjacent, i.e. PFM1 and PFM2; PFM3 and PFM4; PFM5 and PFM6; and PFM7 and PFM8; four progressive format frames LIFM1 to LIFM4 are produced by linear interpolation, or averaging, such that a pixel at a location (x,y) in, say, interpolated frame LIFM2 has a value which is the average of the values of the pixels at locations (x,y) in the progressive frames PFM3 and PFM4. Lastly, eight 2:1 interlaced fields OFD1 to OFD8 at 48 field/s are displayed on a monitor M from the four interpolated frames, with pairs of the output fields being taken from respective interpolated frames.

An important point about the scheme of FIG. 4 is that there is no temporal offset between pairs of output fields OFD1 and OFD2; OFD3 and OFD4; OFD5 and OFD6; and OFD7 and OFD8 due to the formation of the interpolated frames by temporal interpolation between pairs of the progressive scan converted frames.

In a modification to the FIG. 4 arrangement, instead of carrying out the progressive scan conversion and linear interpolation as separate steps, the frame, for example, LIFM1 may be produced directly from the input fields IFD1, IFD2 using a two-dimensional (vertical and temporal) filter as shown by the dotted lines 2DF in FIG. 4.

Figure 5:
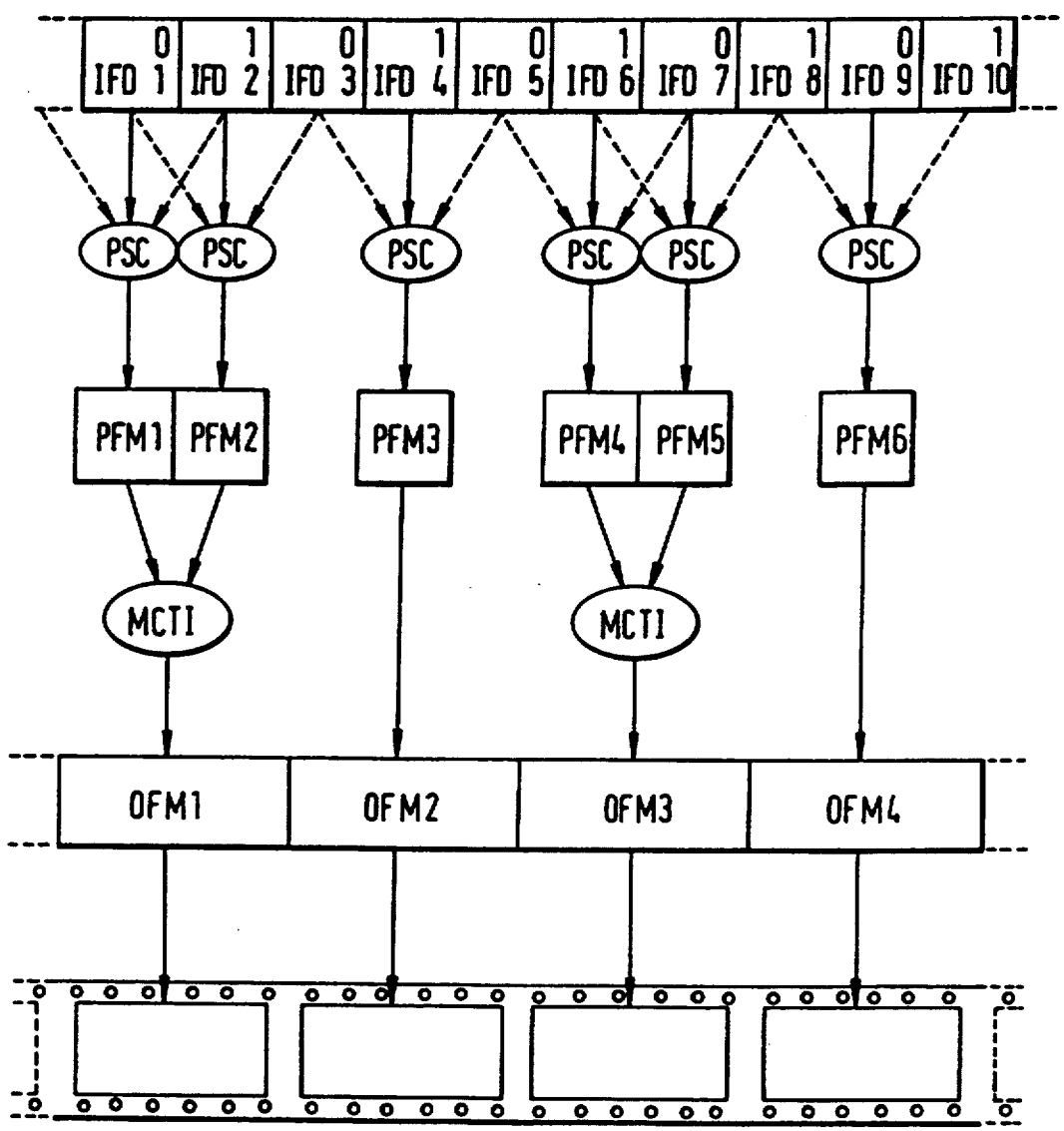
FIG. 5 illustrates a known process for converting 60 field/s 2:1 interlaced video to 24 frame/s film using motion compensated temporal interpolation.

FIG. 5 illustrates a scheme known from GB 2231228A (FIGS. 1 to 48), for converting 60 field/s 2:1 interlaced video to 24 frame/s film using motion compensated temporal interpolation. From a sequence of ten input fields IFD1 to IFD10, six progressive scan format frames PFM1 to PFM6 are produced. From one example, the progressive format frames PFM1 to PFM6 are derived from input fields IFD1, IFD2, IFD4, IFD6, IFD7 and IFD9 by intra-field interpolation. Alternatively or additionally, each of the progressive scan format frames may be derived from the previously mentioned input field and the preceding and succeeding fields using inter-field interpolation. Motion vectors are developed representative of motion of objects in the picture, and a first output frame OFM1 is produced using motion compensated temporal interpolation from the first and second progressive scan format frames PFM1, PFM2 by interpolation half-way along the motion vectors between the two progressive scan format frames. A third output frame OFM3 is similarly produced from the fourth and fifth progressive scan format frames PFM4, PFM5. The second and fourth output frames OFM2 and OFM4 are merely the same as the third and sixth progressive scan format frames PFM3 and PFM6. The output video frames are then recorded on film F. This method reduces the double imaging and 12 Hz judder which occurs in the drop field method described above with reference to FIG. 1.

Figure 6:
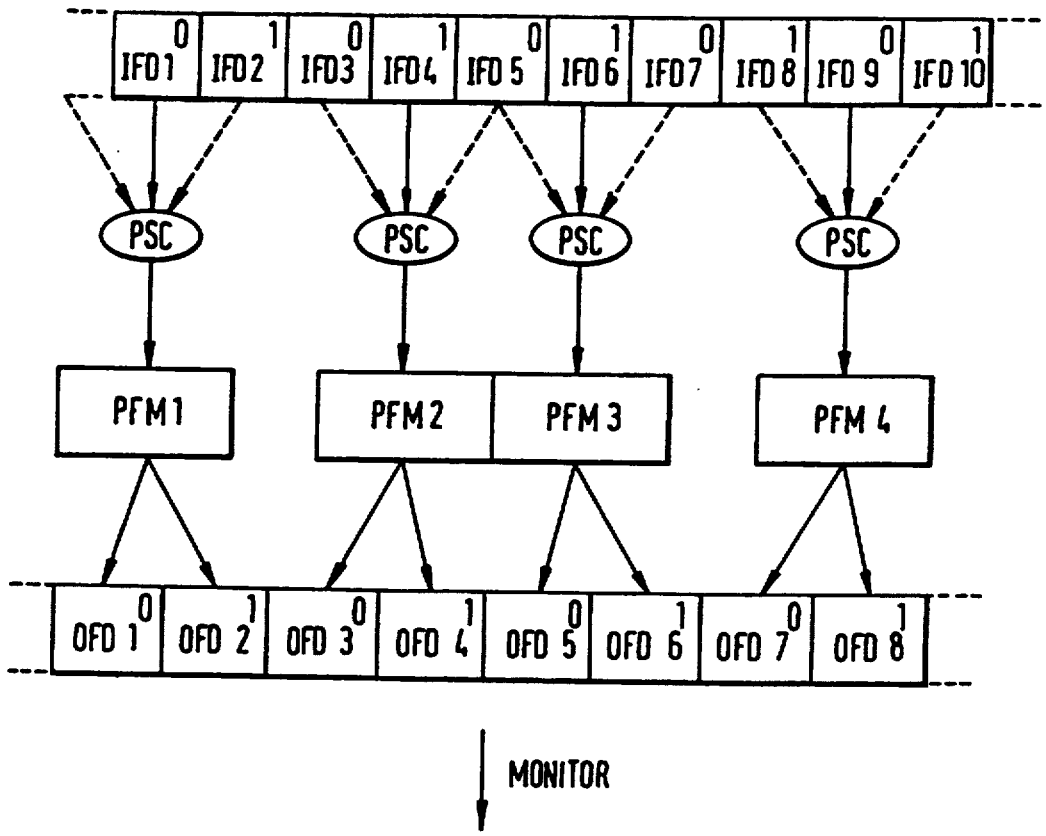
FIG. 6 illustrates a second example of a method according to the invention for simulating the FIG. 5 process.

In order to simulate, on set or on location, the motion compensated temporal interpolation conversion process described above, a second example of the invention as will now be described with reference to FIG. 6 may be employed. In a sequence of ten input video fields IFD1 to IFD10, six of the fields IFD2, IFD3, IFD5, IFD7, IFD8 and IFD10 are dropped. Each of the other input fields is progressive scan converted using intra-field interpolation to form a respective progressive scan format frame PFM1 to PFM4. Alternatively, as shown in FIG. 6 by dotted lines, each of the progressive scan format frames PFM1 to PFM4 may be produced by inter-field interpolation from the above-mentioned input field and the immediately preceding and succeeding input fields. As a further alternative a motion adaptive combination of inter-field and intra-field interpolation may be employed as described in detail in GB 2231228A. Then, eight 2:1 interlaced fields OFD1 to OFD8 are displayed on the monitor M at 48 field/s from the four progressive scan format frames, with each pair of the output fields being taken from a respective one of the progressive scan format frames. The resulting displayed image will partially imitate the motion compensated temporal interpolation video to film conversion process, because it removes the double imaging effect. However, there will still be a 12 Hz judder, or if the progressive scan format frame PFM3 is derived from the seventh input field IFD7, rather than the sixth input field IFD6, a 6 Hz temporal judder component will also arise. Again, an important point about the scheme of FIG. 6 is that there is no temporal offset between the fields of each pair of output fields.

Figure 7:
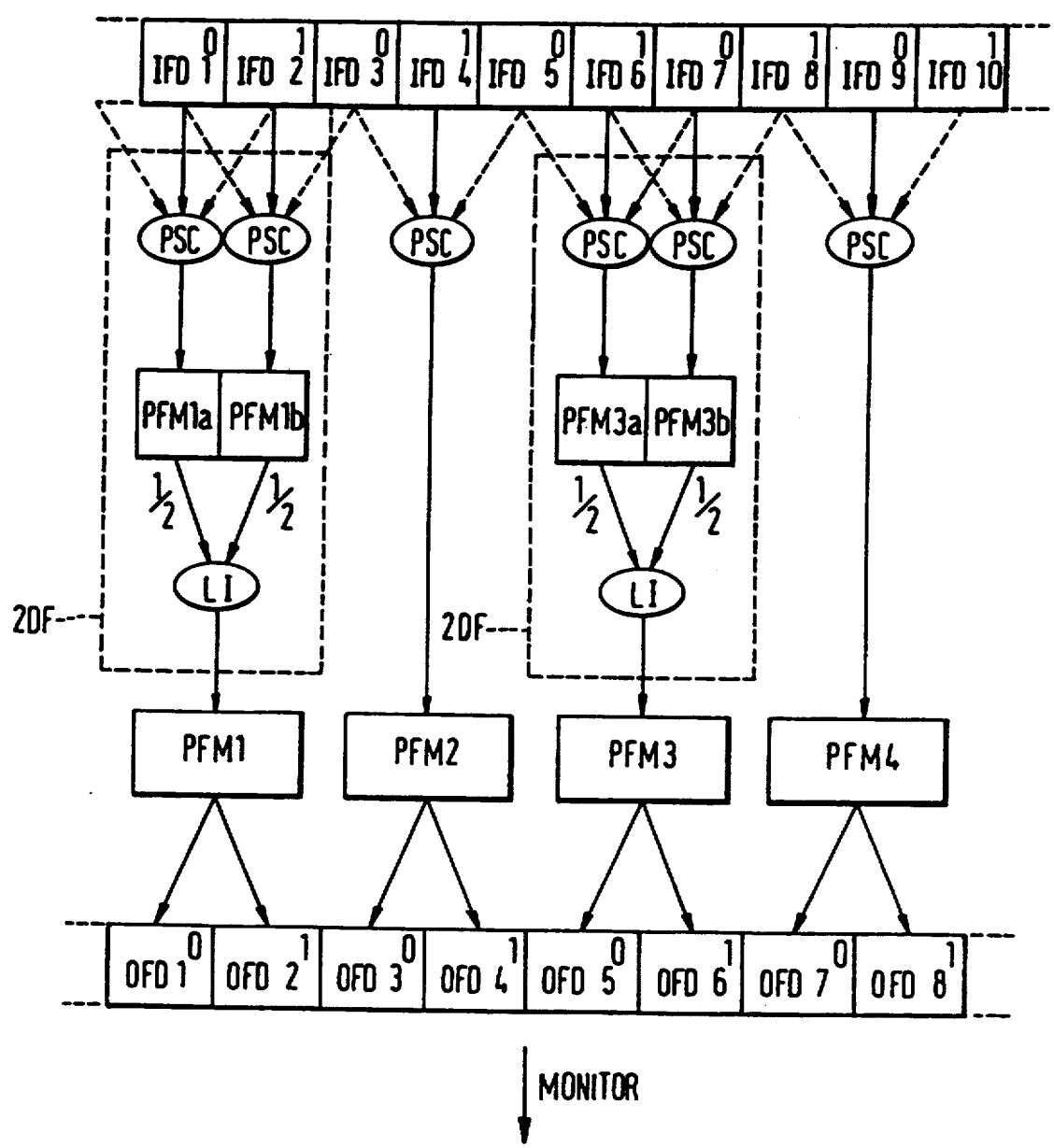
FIG. 7 illustrates a first modification to the FIG. 6 example.

A modification to the example of FIG. 6, which overcomes the temporal judder problem, will now be described with reference to FIG. 7. Six progressive scan format frames PFM1a, PFM1b, PFM2, PFM3a, PFM3b and PFM4 are formed by intra-field interpolation of the first, second, fourth, sixth and seventh and ninth input fields IFD1, IFD2, IFD4, IFD6, IFD7 and IFD9, respectively, or additionally by inter-field interpolation between these input fields and the temporally adjacent fields (as shown by dotted lines in FIG. 7) in an adaptive manner as described in GB 2231228A. Two further progressive scan format frames PFM1 and PFM 3 are also produced by inter-frame linear interpolation halfway between the progressive scan format frames PFM1a, PFM1b, and the progressive scan format frames PFM3a, PFM3b. The output fields OFD1 to OFD8 are produced from the progressive scan format frames PFM1 to PFM4 in a similar manner to that described above with reference to FIG. 6. It will be appreciated that this scheme removes the temporal judder. However, the second and fourth progressive scan format frames PFM2 and PFM4 and their corresponding output fields suffer from loss of vertical resolution except in static areas in the case where frames are produced by inter-field interpolation. Also the first and third progressive scan format frames are blurred in areas of motion. This switching between the two methods of producing the progressive scan format frames at 12 Hz may be noticeable in some material.

It is not necessary to produce, for example, the progressive scan format frames PFM1a, PFM1b before producing the frame PFM1. Alternatively, the frame PFM1 may be produced directly from the input field IFD1, IFD2 using a two-dimensional (vertical and temporal) filter as shown by the dotted lines 2DF in FIG. 7. In its simplest form, the filter would produce as the value of a pixel at a location (x,y) in the output frame, the sum of: half of the value of the pixel at location (x,y) in the input field which contained a pixel at location (x,y); and one-quarter of the value of the pixel at location (x,y−1) in the other input field; and one-quarter of the value of the pixel at location (x,y+1) in that other input field.

Figure 8:
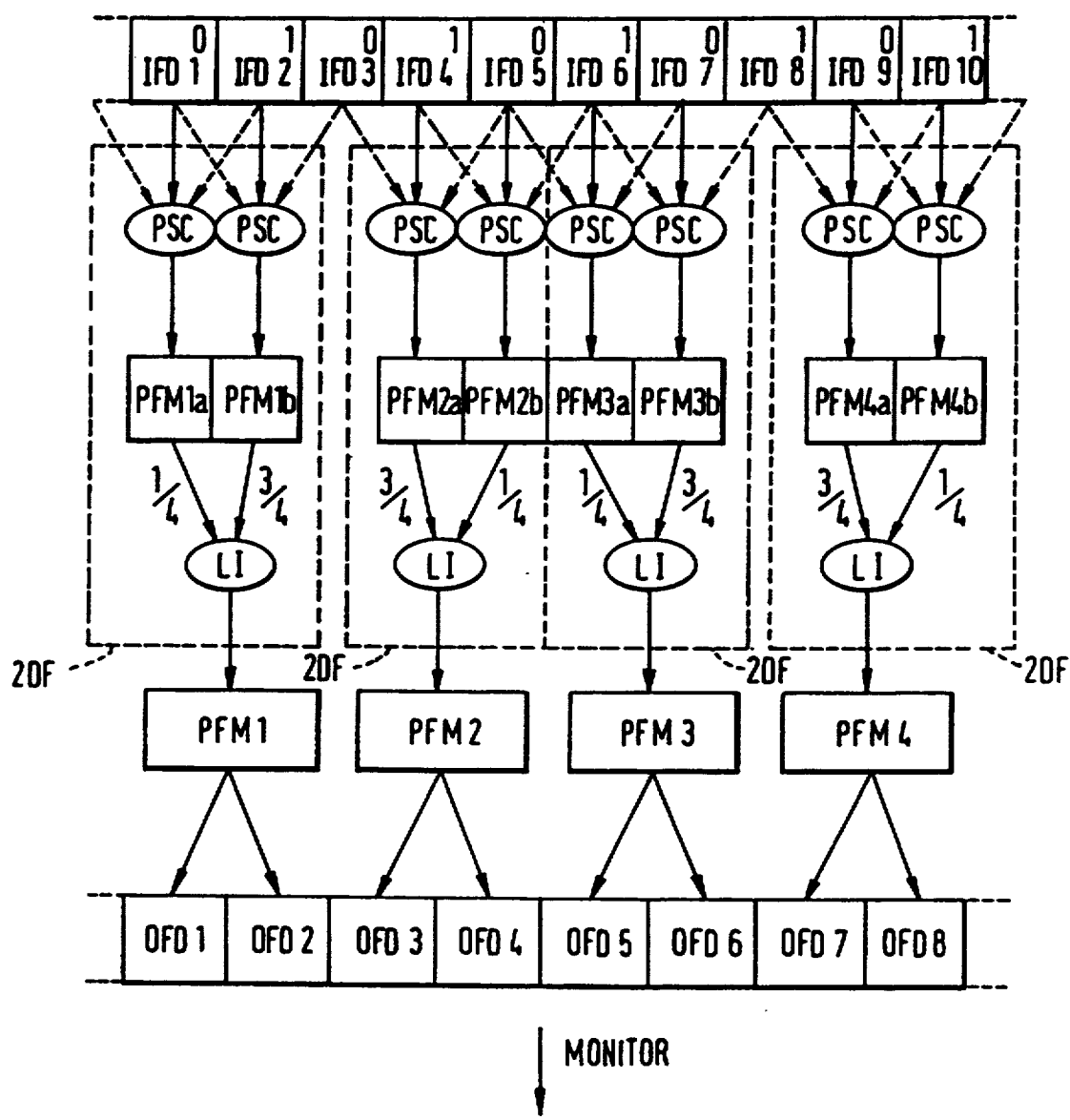
FIG. 8 illustrates a second modification to the FIG. 6 example.

A modification to the arrangement of FIG. 7 which smooths out the 12 Hz switching effect will now be described with reference to FIG. 8. Eight progressive scan format frames PFM1a, PFM1b, PFM2a, PFM2b, PFM3a, PFM3b, PFM4a and PFM4b are produced from the input fields IFD1, IFD2, IFD4, IFD5, IFD6, IFD7, IFD9 and IFD10, respectively, by intra-field (vertical) interpolation, or adaptively by such intra-field interpolation and inter-field between the temporally adjacent fields. Also, four progressive frames PFM1 to PFM4 are produced by inter-frame (temporal) linear interpolation: three-quarters of the way between the frames PFM1a, PFM1b; one-quarter of the way between the frames PFM2a, PFM2b; one-quarter of the way between the frames PFM3a, PFM3b; and one-quarter of the way between the frames PFM4a, PFM4b, respectively. The eight output fields OFD1 to OFD8 are produced in a similar fashion to that described above with reference to FIGS. 6 and 7. This arrangement removes the 12 Hz switching effect arising in the FIG. 7 arrangement, but with slight loss of dynamic resolution compared with the FIG. 7 arrangement, and there is a 12 Hz judder component.

Similarly to as described with reference to FIG. 7, the progressive scan format frames PFM1 to PFM4 may be formed directly from the input fields using a two dimensional (vertical and temporal) filter as shown by the dotted lines 2Df in FIG. 8.

Figure 9:
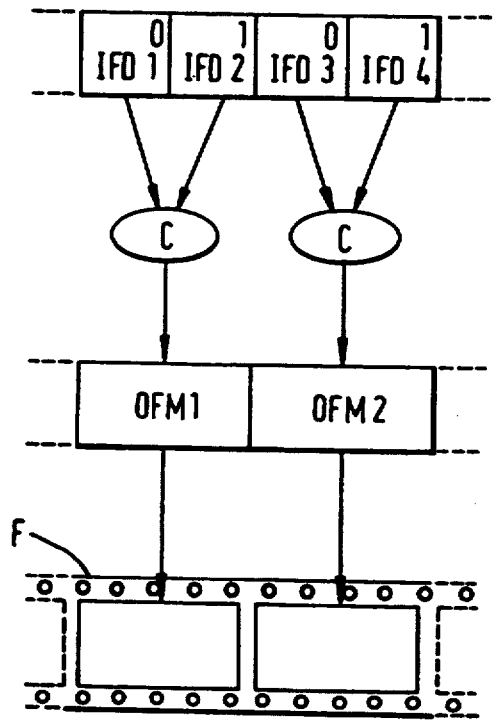
FIG. 9 illustrates a known process for converting 60 field/s 2:1 interlaced video to 30 frame/s film by field combination.

Referring to FIG. 9, in a known conversion from 60 field/s 2:1 interlace video to 30 frame/s film by the repeat field process, pairs of input fields, for example IFD1, IFD2 are composited to produce output frames, for example OFM1, and the output frames are recorded on film material F. Because of the temporal offset between the two input fields making up a single output frame, double imaging will occur in the output picture in areas of motion.

Figure 10:
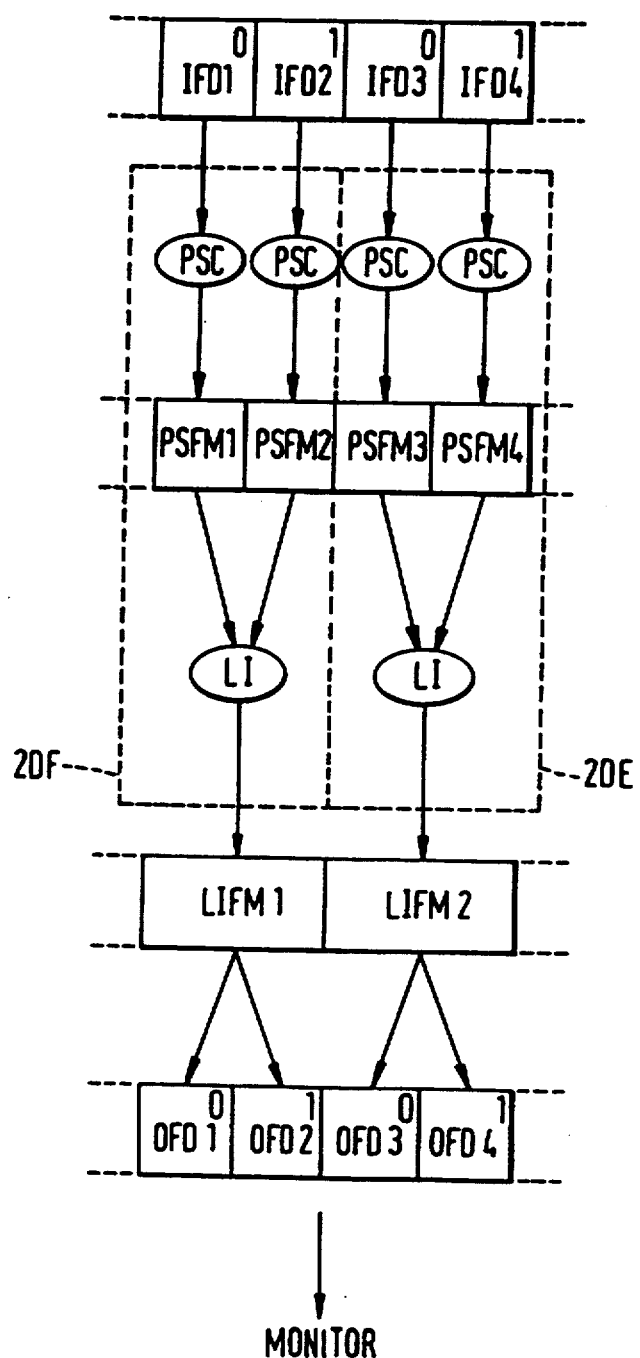
FIG. 10 illustrates a third example of a method according to the invention for simulating the FIG. 9 process.

In order to simulate the field combination process on set or on location a third example of the invention, as shown in FIG. 10, may be employed. For each input field IFD1 to IFD4, a respective progressive scan format frame PSFM1 to PSFM4 is produced by intra-field interpolation. Then, for each pair of progressive scan format frames, for example PSFM1, PSFM2, a respective progressive scan format frame, for example LIFM1, is produced by linear interpolation half way between the progressive scan format frames PSFM1, PSFM2. Then, two 2:1 interlaced fields, for example OFD1, OFD2 at 60 fields per second are displayed from each linearly interpolated frame.

An important point about the scheme of FIG. 10 is that there is no temporal offset between pairs of the output fields, for example OFD1, OFD2, due to the formation of the interpolated frames, for example LIFM1, by temporal interpolation between pairs of the progressive scan converted frames.

Similarly to as described with reference to FIGS. 7 and 8, the progressive scan format frames LIFM1, LIFM2 may be produced directly from the input fields using a two-dimensional (vertical and temporal) filter as shown by the dotted lines 2dF in FIG. 10.

Figure 11:
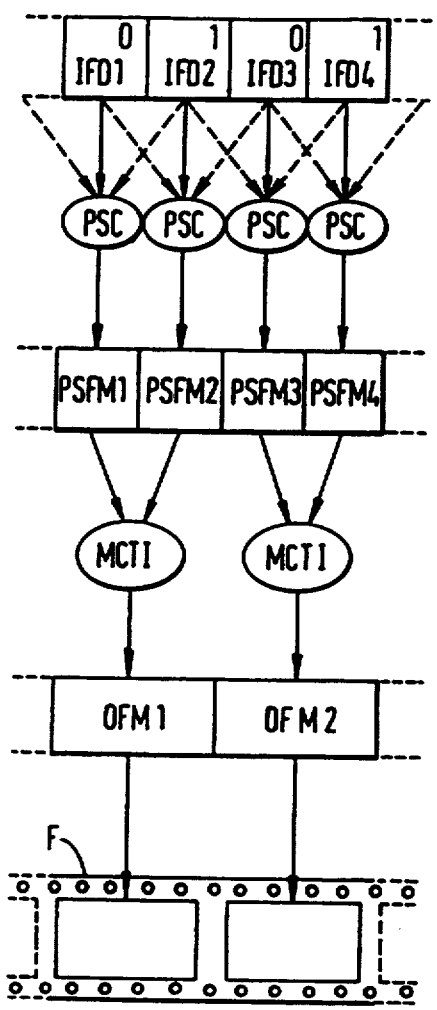
FIG. 11 illustrates a previously proposed process for converting 60 field/s 2:1 interlaced video to 30 frame/s film using motion compensated temporal interpolation.

FIG. 11 illustrates a scheme, previously proposed in GB 9024836.6 (FIGS. 57 to 60), for converting 60 field/s 2:1 interlace video to 30 frame/s film using motion compensated temporal interpolation. For each input field (for example IFD2) a respective progressive scan format frame (for example PSFM2) is produced by intra-field interpolation of the field IFD2 and/or by inter-field interpolation of that field IFD2 and the temporally adjacent fields IFD1, IFD3. Motion vectors are developed representative of motion of objects in the picture, and an output frame (OFM1) is produced using motion compensated temporal interpolation from a respective pair of the progressive scan format frames (PSFM1, PSFM2) by interpolation half-way along the motion vectors between the two progressive scan format frames. The output frames are then recorded on film F. Unlike the field combination process described above with reference to FIG. 9, the film transfer process using motion compensated temporal interpolation does not suffer from double imaging.

Figure 12:
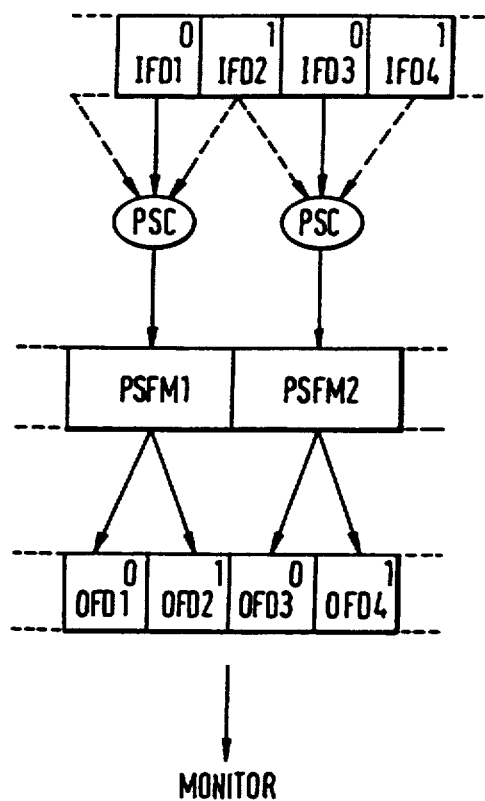
FIG. 12 illustrates a fourth example of a method according to the invention for simulating the FIG. 11 process.

In order to simulate, on set or on location, the motion compensated temporal interpolation conversion process described above, a fourth example of the invention as will now be described with reference to FIG. 12 may be employed. For each alternate input field IFD1, IFD3, etc., a respective progressive scan format frame PSFM1, PSFM2, etc., is produced using intra-field interpolation, optionally and adaptively with some degree of inter-field interpolation between that field and the temporally adjacent fields. 2:1 interlaced output fields OFD1, OFD2, etc., are then displayed at 60 field/s per second on the monitor M, with each pair of output fields being taken from a respective one of the progressive scan format frames. It will be appreciated that this simulation method does not create any temporal judder, and there will be no double imaging. However, the vertical resolution of the output frames will be lower in areas of motion, and also in static areas unless adaptive inter-field interpolation is used.

Figure 13:
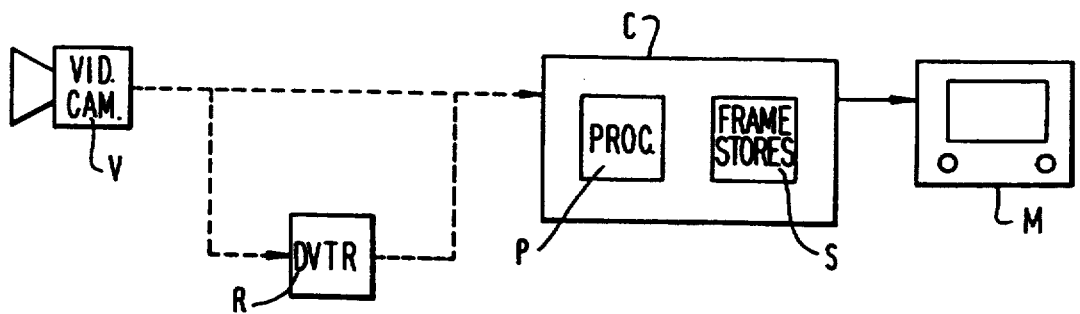
FIG. 13 is a block diagram of an apparatus for performing the examples referred to above.

FIG. 13 illustrates an embodiment of an apparatus according to the invention for performing the various methods described above. The apparatus comprises a video camera V which provides a video signal either directly to a converter C, or indirectly via a digital video tape recorder R. The converter C provides an output video signal to a monitor M, which either operate on 48 field/s 2:1 interlace format in the case of the examples described with reference to FIGS. 4, 6, 7 and 8, or on 60 field/s 2:1 interlace format in the case of the examples described above with reference to FIGS. 10 and 12. The converter C comprises a plurality of frame stores S and a processor P which directs the video signals between the camera V (or the recorder R) and the frame stores S, and between the frame stores S and the monitor M, and which also performs the progressive scan conversion operations and the linear interpolation operations mentioned above.

Having described a preferred embodiment of the invention with reference to the accompanying drawings, it is to be understood that the invention is not limited to the precise embodiment and that various changes and modification thereof may be effected by one skilled in the art without departing from the spirit or scope of the invention as defined in the appended claims.

What is claimed is:

1. A method of displaying an input video signal on an interlaced display, said input signal being made up of interlaced fields at a rate of 60 field/s and with 2:1 interlace, the method comprising the steps of:
    forming from at least some of said fields of said input video signal a series of progressive scan format frames; and
    displaying sequentially interlaced fields of said progressive scan format frames at a rate of 48 field/s with 2:1 interlace.

2. A method as claimed in claim 1, which is performed at real-time rate.

3. A method as claimed in claim 1, wherein said progressive scan format frames and said displayed fields have equal frame rates.

4. A method as claimed in claim 1, wherein each said progressive scan format frame is produced by vertical interpolation of and temporal interpolation between a respective pair of said input fields.

5. A method as claimed in claim 4, wherein such vertical and temporal interpolation is performed by a two-dimensional filter.

6. A method as claimed in claim 4, wherein said step of forming said series of progressive scan format frames includes dropping two out of every ten fields of said input signal.

7. A method as claimed in claim 1, wherein said frames of said series are each produced by temporal interpolation between a respective pair of temporally adjacent fields of said input signal.

8. A method as claimed in claim 7, wherein alternate frames of the series are produced with one temporal interpolation ratio and the other frames of the series are produced with another interpolation ratio.

9. A method of displaying an input video signal having interlaced fields on an interlaced display, comprising the steps of:
    forming a preliminary series of progressive scan format frames, each of the frames in said preliminary series being produced by intrafield interpolation of a respective one of the input fields;
    forming a second series of progressive scan format frames, each of the frames in the second series being produced by inter-frame interpolation between a respective pair of frames of the preliminary series, the second series having a frame rate which is one-half a frame rate of the preliminary series; and displaying sequentially interlaced fields of said progressive scan format frames of the second series.

10. A method of displaying an input video signal on an interlaced display, said input signal being made up of interlaced fields at a rate of 60 field/s and with 2:1 interlace, the method comprising the steps of:

forming from at least some of said fields of said input video signals a series of progressive scan format frames, each said progressive scan format frame being produced by vertical interpolation of and temporal interpolation between a respective pair of said input fields; and displaying sequentially interlaced fields of said progressive scan format frames at a rate of 60 field/s with 2:1 interlace.

11. A method of displaying an input video signal having interlaced fields on an interlaced display, comprising the steps of:

forming from at least some of said fields of said input video signal a series of progressive scan format frames, each of said progressive scan format frames being produced by a selected one of intra-field interpolation of a respective one of the input fields and inter-field interpolation between the fields temporally adjacent that field; and displaying sequentially interlaced fields of said progressive scan format frames.

12. A method as claimed in claim 11, wherein:

said input signal and said display are each characterized by 60 field/s and 2:1 interlace; and said input fields with respect to which said interpolation is performed consist of alternate ones of the input fields.

13. A method of displaying an input video signal having interlaced fields on an interlaced display, said input video signal being characterized by 60 field/s and 2:1 interlace, said display being characterized by 48 field/s and 2:1 interlace, the method comprising the steps of:

forming from at least some of said fields of said input video signal a series of progressive scan format frames, each being produced by a selected one of intra-field interpolation of a respective one of the input fields and inter-field interpolation between the fields temporally adjacent that field, said input fields with respect to which said interpolation is performed consisting of four out of every ten fields of said input video signal; and displaying sequentially interlaced fields of said progressive scan format frames.

14. A method of displaying an input video signal having interlaced fields on an interlaced display, comprising the steps of:

forming from at least some of said fields of said input video signal a series of progressive scan format frames, some of the frames of said series of progressive scan format frames being produced by vertical interpolation of and temporal interpolation between a respective pair of the input fields, and others of the frames of said series being produced by a selected one of intra-field interpolation of a respective one of the input fields and inter-field interpolation between the fields temporally adjacent that input field; and displaying sequentially interlaced fields of said progressive scan format frames.

15. A method as claimed in claim 14, wherein such vertical and temporal interpolation is performed by a two-dimensional filter.

16. A method as claimed in claim 14, wherein such vertical and temporal interpolation is performed by producing a respective preliminary progressive scan format frame from each field of said pairs of fields, and by forming said some frames by inter-frame interpolation between the frames of the pairs of preliminary frames.

17. A method as claimed in claim 14, wherein said some frames are alternative frames of the series.

18. A method as claimed in claim 14, wherein said some frames are temporally interpolated half-way between the respective input fields.

19. A method as claimed in claim 14, wherein:

said input signal is characterized by 60 field/s and 2:1 interlace;

said display is characterized by 48 field/s and 2:1 interlace;

a first and a third of four of said progressive scan format frames are formed by vertical interpolation of and temporal interpolation between a first and a second, and a sixth and a seventh, respectively of ten of said input fields;

a second of said four frames is formed by a selected one of intra-field interpolation of a fourth of said ten fields and inter-field interpolation between a third to a fifth of said ten fields; and a fourth of said four frames is formed by a selected one of intra-field interpolation of a ninth of said ten fields and inter-field interpolation between an eighth to a tenth of the ten fields.

20. A method of displaying an input video signal having interlaced fields on an interlaced display, comprising the steps of:

forming from at least some of said fields of said input video signal a series of progressive scan format frames, each of said frames of said series being produced by temporal interpolation between a respective pair of temporally adjacent fields of said input signal, alternate frames of the series being produced with a temporal interpolation ratio of $\frac{1}{4}:\frac{3}{4}$ and the other frames of the series being produced with a temporal interpolation ratio of $\frac{3}{4}:\frac{1}{4}$; and displaying sequentially interlaced fields of said progressive scan format frames.

21. A method of displaying an input video signal having interlaced fields on an interlaced display, said input signal being characterized by 60 field/s and 2:1 interlace, said display being characterized by 48 field/s and 2:1 interlace, the method comprising the steps of:

forming from at least some of said fields of said input video signal a series of progressive scan format frames, each being produced by temporal interpolation between a respective pair of temporally adjacent fields of said input signal, four frames of said series of progressive scan format frames being temporally interpolated between four pairs of a series of ten of said input fields; and displaying sequentially interlaced fields of said progressive scan format frames.

22. An apparatus comprising a video source for providing an input video signal made up of interlaced fields at a rate of 60 field/s, a converter for converting the input video signal to an output video signal, and a video monitor for displaying a picture represented by the output video signal, the converter comprising means for forming a series of progressive scan format frames from at least some of said fields of said input video signal, and said monitor being arranged to display sequentially interlaced fields of said progressive scan format frames at a rate of 48 fields.

* * * * *